J. W. HORNSEY.
APPARATUS FOR TREATING MATERIALS.
APPLICATION FILED JULY 15, 1910. RENEWED AUG. 26, 1916.
1,293,780.
Patented Feb. 11, 1919.
4 SHEETS—SHEET 1.
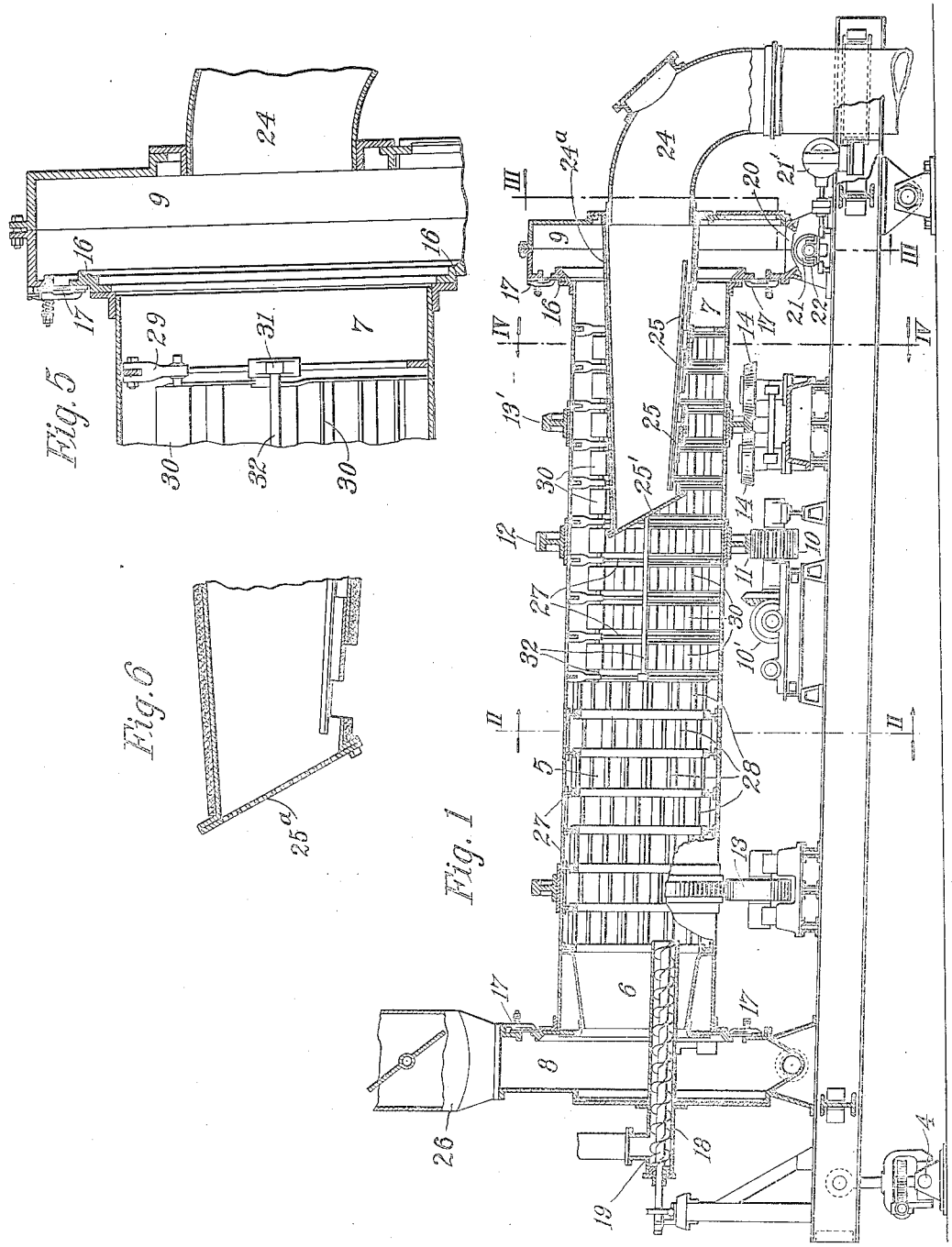

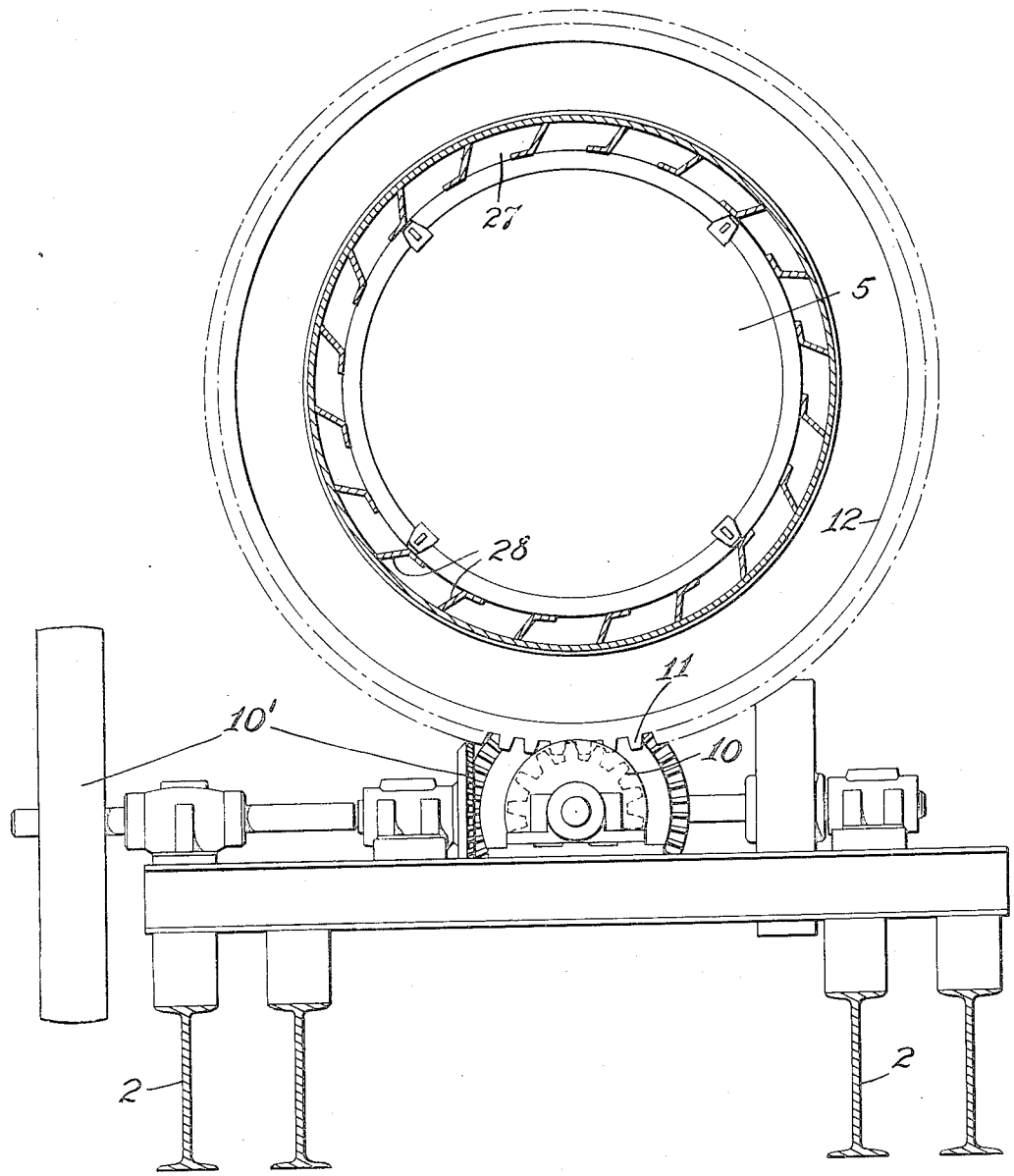

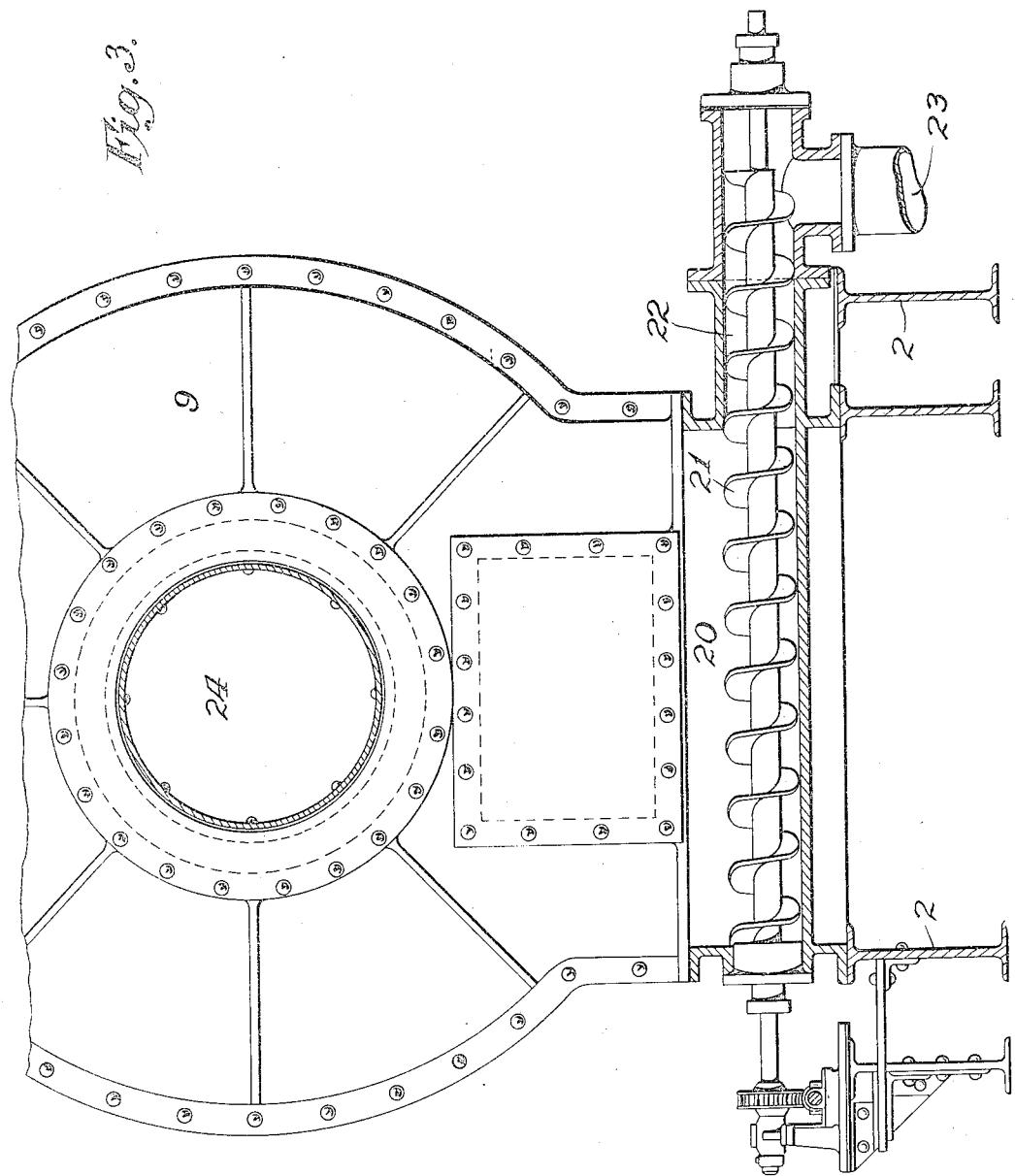

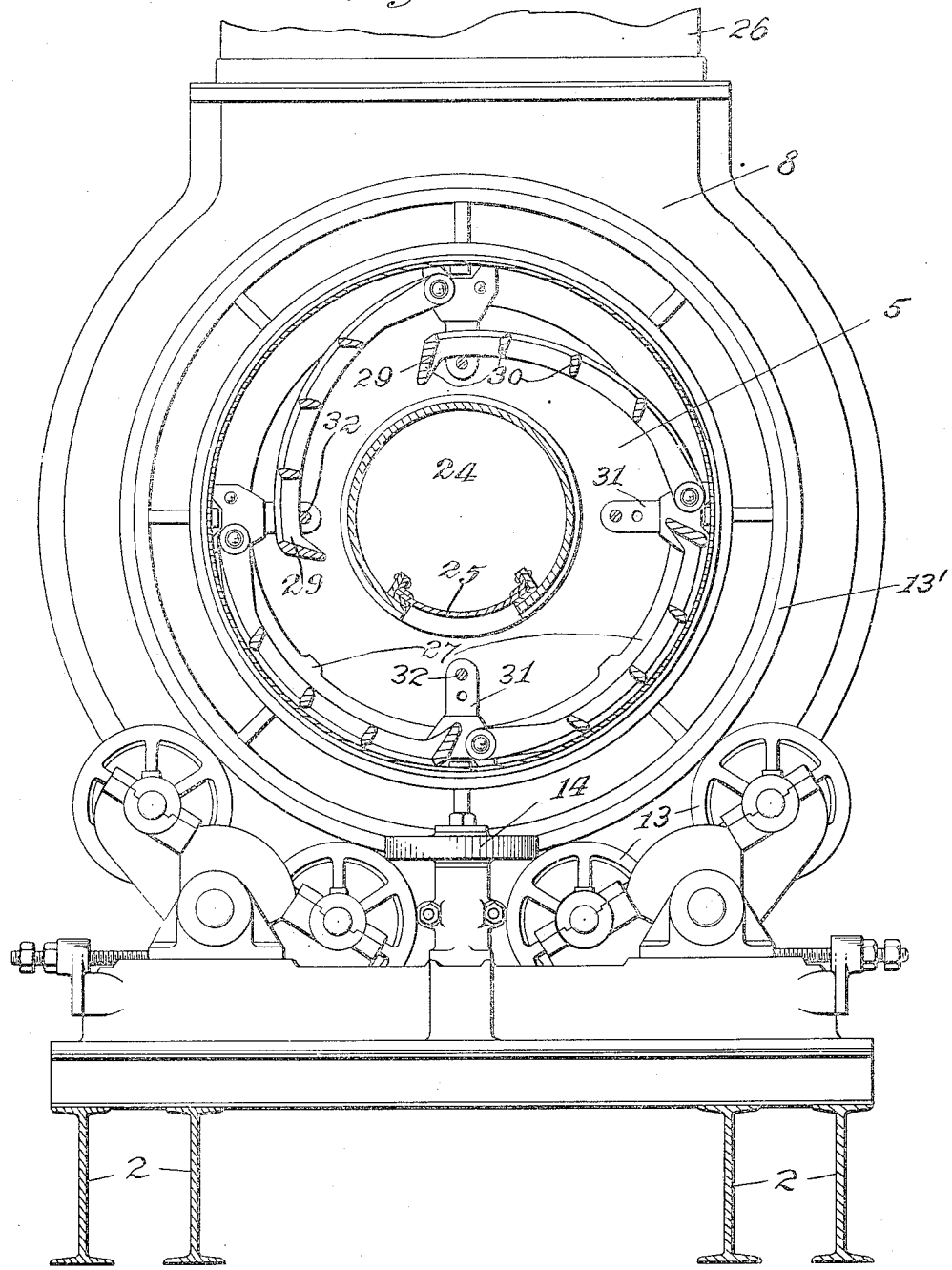

UNITED STATES PATENT OFFICE.

JOHN W. HORNSEY, OF SUMMIT, NEW JERSEY, ASSIGNOR TO GENERAL REDUCTION GAS AND BY-PRODUCTS COMPANY, A CORPORATION OF DELAWARE.

APPARATUS FOR TREATING MATERIALS.

1,293,780. Specification of Letters Patent. Patented Feb. 11, 1919.

Application filed July 15, 1910, Serial No. 572,130. Renewed August 26, 1916. Serial No. 117,068.

*To all whom it may concern:*

Be it known that I, JOHN W. HORNSEY, a citizen of the United States, residing at Summit, Union county, New Jersey, have invented new and useful Apparatus for Treating Materials, of which the following is a specification, reference being had to the accompanying drawings in which—

Figure 1 is a longitudinal section of an apparatus embodying my invention; Fig. 2 is a section on lines II—II of Fig. 1; Fig. 3 is an elevation of the discharge end, partly in section; Fig. 4 is a section on lines IV—IV of Fig. 1; Fig. 5 is a section of the discharge end showing a modified form of my apparatus, and Fig. 6 is a section showing a modified form of inlet for the treating medium.

My invention relates to the treatment of materials wherein it is desired to produce a physical, mechanical or chemical change by bringing one or more materials into contact with one or more treating mediums, and it is designed to provide apparatus suitable for treating of materials where either or both the material and the treating medium may be in gaseous, vaporous, liquid, semi-liquid or other fluid or solid form. The invention is specially applicable to the treatment of such materials as sugar, starch, salt, milk, coal, lignite, peat, sawdust, petroleum, tannic acid, molasses, ores of various character, and many other substances—whether elimination of moisture, concentration, evaporation, crystallization, fractional or destructive distillation, purification, physical, mechanical or chemical transformation or change is desired.

My invention is especially valuable when used in rotary apparatus, since it enables materials of any character to be treated in contact with treating mediums of any character at any desired sub or super-atmospheric temperature or pressure by keeping the material constantly in motion and in a sub-divided form, exposing separated particles of the material repeatedly to the path of the treating medium and prevents choking or clogging of the apparatus in which my improvements are used.

The primary object of this invention is to expose the largest possible surface of the material to the treating medium to secure the most favorable conditions for interaction of the material and the treating medium, by exposing the separated, individual particles of the one to be repeated, changing contact upon all sides with separated, individual particles of the other, thus obtaining the maximum amount of shifting surface contact, and breaking up the continuity of any current of gaseous or vaporous matter which might otherwise pass through the apparatus unaffected. This object is attained in my apparatus in which an evenly-distributed showering action is produced by motion of an agitated vessel adapted to repeatedly elevate distribute and shower the material or the treating medium, as the case may be, throughout the entire cross-section of the apparatus in a shower of uniform density.

It is well known that heat will, as a rule materially accelerate chemical, mechanical or physical change when a material is brought into contact with a treating medium. To apply heat with the view of securing the most efficient operating temperature, either or both the material or the treating medium may be heated prior to their introduction into the apparatus. While the application of heat to the vessel or to the treating medium is well known, I may in some cases introduce material in a heated condition and depend upon this as my sole source of heat, which method of operation I believe to be new.

One object which I attain by employing my apparatus, is the efficient elimination from materials of moisture which exists whether as a solution in liquid form, as a liquid carrying a solid in suspension, or as moisture impregnating a solid. To accomplish this, I employ currents of air or gas as the treating medium or vehicle for carrying off the moisture present in the material under treatment, and my apparatus is such that the material is kept in a condition to be effectively acted upon by the currents of the treating medium. In this case the material is a solid, fluid or liquid and the treating medium is gaseous in form.

Another useful application of my invention is found in the purification or cleansing of air or gas by passing the same through materials having an affinity for the impurities contained therein, in which case the air or gas becomes the material being treated, while the material with which it is brought into contact becomes the treating medium or vehicle for carrying off the impurities, and still other applications will readily suggest themselves.

I shall herein show and describe my apparatus in forms which I have found to be preferable for actual use, but it will be understood that many changes may be made therein and that the forms here illustrated and described constitute merely preferred embodiments of my invention.

Referring to the drawings, 2 is a horizontal base supported preferably at one of its ends upon a shaft 3 and its other end having jacking mechanism 4 which furnishes a support for that end of the base 2 and of the chamber 5 mounted thereon to be varied at will. While I have shown the chamber 5 in the form of a cylinder, which I prefer, it may be made in other forms and serve the same purpose. This cylinder 5 at its feed end 6 and discharge end 7, preferably opens into the fixed heads 8 and 9 respectively. The cylinder is preferably rotated by the gear wheel 10, driven by any suitable means, as for instance the mechanism 10' which meshes with the rack 11 of the girth gear 12. The cylinder is supported by the roller bearings 13, of which I preferably use two sets, one near each end of the cylinder. In connection with one of these sets, I preferably employ horizontally disposed thrust rollers 14 which bear on one of the rings 13' and prevent the cylinder from having any longitudinal movement.

The ends 6 and 7 of the cylinder 5 have attached to them flaring rings 16 and the joint between them and the openings in the fixed heads 8 and 9 may be effected in any suitable manner to render them gas, air, water or dust tight. I prefer the form of joint shown and described in detail in an application for patent filed July 15, 1910, Serial No. 572135, the joints consisting of adjustable, flexible annular plates 17 mounted on the heads 8 and 9, and bearing upon the rings 16.

18 is an intake which projects through the fixed head 8 into the cylinder 5, and through which either solid or fluid materials or treating mediums are admitted. A conveyer 19 driven by any suitable means is shown which is specifically adapted for use in handling solids. In the lower portion of the fixed head 9 is located a pocket 20 in which is preferably operated a second screw conveyer 21 adapted to drive the treated material or the used treating medium, which has passed through the cylinder, through the offtake 22 and the discharge passage 23 driven by any suitable means 21'.

24 is an inlet pipe which extends through the fixed head 9 into the cylinder 5, and is adapted to admit currents of air or other gaseous treating mediums or materials thereinto. The inlet pipe 24 has adjustable doors 25 through which the air or gas currents may be admitted into the cylinder near the lower portion of the cylinder. The inlet pipe 24 may be jacketed with asbestos or other non-conducting material 24$^a$ and doors 25 suitably adjusted to prevent over-heating of any substance at that end of the cylinder. This is of advantage in the treating of materials which are injured by super-heating in the dry state, such as gunpowder, which may safely be subjected to a moderately high temperature in its wet condition in the earlier stages of drying, but must be kept comparatively cool as it approaches dryness. The pipe 26, serving as an outlet for the air or gas, is connected to the fixed head 8.

I preferably arrange at intervals along the interior of the cylinder 5 transverse ribs 27, and in the spaces between them (preferably in each such space) are a series of distributing cups or buckets 28 substantially parallel to the axis of revolution of the cylinder. The height and spacing of the ribs 27 and of the buckets 28 may be varied to suit the substance which they are called upon to handle. It is apparent that the ribs 27 while of great advantage in treating liquids (in order to prevent the liquid from flowing through the cylinder too rapidly) are not so important although desirable, in treating solids. The cylinder is inclined from the feed end 6 to the discharge end 7, and the angle of inclination may be varied by means of the jacking mechanism 4, for delaying or accelerating the passage of the material through the cylinder. The buckets 28 are preferably staggered in alternate sections, to assist in securing an evenly distributed showering action, and so shaped that when filled with the material to be treated, they will allow it to fall out in a uniform stream or shower across the entire inside diameter of the cylinder, as it rotates. The successive staggered sections of buckets cause the material to fall in staggered showers which together present continuous curtains of falling material through which the treating medium must pass, thus insuring efficient contact between the material and the treating medium.

The treating medium, such as air or gas, may be introduced through the inlet 24 into the cylinder 5 at any desired temperature and in varying amounts, depending on the character of the material under treatment and the results which are to be produced. Pyrometers or other devices for ascertaining and regulating the temperature may be used in connection with my apparatus.

Where it is desired to act upon certain materials which when dried assume the form of a very finely divided or impalpable powder, such as starch or clay, the treating medium,—in this case heated air or gas,— tends to carry away with it a large percentage of the material to be treated in the form of dust, which is wasted and lost. This is due partly to the fact that the air leaves the cylinder in an unsaturated condition, and consequently in a suitable condition to carry off the dust, and partly to the fact that there is a well defined current of air passing through the cylinder. To prevent this I provide in the pipe 26 a damper 34 of the butterfly or other suitable type, which may be partially closed so that the heated air or gas passing through the cylinder is retarded in its passage and compelled to follow a more or less devious path from the inlet 24, thereby becoming fully saturated with moisture, in which condition it readily parts with water to the dust, which is then thrown down and passes out with the dried material, without any loss. One function of the inlet pipe 24 is to carry most of the air or gas past that portion of the cylinder in which the material has become so far dried as to break up into dust. By these means, combined with the flexible joint 17, I am enabled to entirely prevent any escape of dust from the cylinder, thereby rendering its operation more efficient and convenient than is the case with any apparatus at present known to the art.

Near the discharge end of the cylinder I have shown a series of cradles or movable buckets 29. These cradles 29, having cups or shelves 30 extending lengthwise of the cylinder, are preferably pivoted to stirrups 31 and lie between the ribs 27, and are adapted, as the cylinder is rotated, to drop down onto the stops 32, their movement, and the jar produced by coming against the stops 32, serving to dislodge any material that may have adhered to them and to the cups carried by them, and the cradles then fall back against the cylinder casing as the rotation is continued, producing a second though less pronounced jar. These cradles are of marked advantage in handling materials or treating mediums which tend to choke, clog or stick to the apparatus as they operate to keep a sticky substance in motion which is essential to successful continuous operation of apparatus of this type.

In Fig. 5 I show a modification of my invention in which the inlet pipe 24 extends only so far as the outer wall of the fixed head 9. This modification is advantageous when treating material which does not reach a dry and minutely divided or dusty state near the discharge end or is not injured by a high temperature in the later stages of the treatment.

In Fig. 6 I show a modified form of my invention in which the end of the inlet pipe is comprised of a perforated plate 25ᵃ. This form is desirable for use when very dusty or dry materials are being treated, and is adapted to carry the major portion of the gas or treating medium entirely beyond that portion of the cylinder in which the materials have reached this dusty state.

The operation of my invention is as follows: The cylinder having been set in rotation, the material to be treated is fed into the cylinder through the intake 18, the screw conveyer 19 being employed, when necessary, to assist the feed. The material either fluid or solid, is advanced by the rotation of the cylinder and its inclination toward the discharge end 7. The movement of the material is retarded by the ribs 27, and during this movement it is constantly being lifted by friction with the cylinder and ribs and by means of the buckets 28 or cradles 29, as the case may be, and dropped in a well-distributed shower so that it is constantly kept in agitation in a finely divided state and repeatedly returned to the path of the treating medium.

Through the inlet 24 at the opposite end of the cylinder 5 I admit the treating medium, such as heated currents of air or gas which passes through the material, takes up the matter sought to be eliminated, and carries it off through the outlet 26. Such treating medium acts effectively upon the material until the material is showered down through the discharge end 7 of the cylinder and is finally carried off by the offtake 22 by the screw conveyer 21 and the discharge passage 23, from which it is deposited in a suitable receptacle or is conveyed away for further treatment.

When desired, both the material and the treating medium may be introduced into the apparatus at the same end, as through the intake 18.

The speed of rotation of the cylinder is to be governed by the character of the material being treated, and the inclination of the cylinder will also play a part in the feeding of the material through the cylinder.

When treating solids or semi-solids the work of the apparatus is facilitated by the repeated impingement of the particles of the material, or the treating medium, upon the interior of the chamber, by which the particles tend to disintegrate or be disrupted, exposing new surfaces to the action as the material is repeatedly supplied or returned to the path of the treating medium.

My apparatus is also especially adapted for the manufacture or purification of illuminating and other gases, with or without the presence of a treating medium. When gas is being purified or cleansed, the treating medium is fed into the cylinder through the intake 18, the gas to be purified being admitted to the cylinder through the pipe 24 is removed through the gas outlet 26.

The terms "rotary" and "rotatable" with reference to the chamber implies a movement in a rotary direction, and is not limited to travel in a single direction, nor to the performance of a complete revolution, but includes also an oscillatory, rocking, or semi-rotation in opposite or reverse directions; or any equivalent motion which may be employed in order to supply the substance to be acted upon to or through the path or area of the treating medium repeatedly, in its travel in or through the chamber.

It will be seen by those skilled in the art that many changes may be made in my apparatus without departing from the spirit of my invention, since what I claim is:

1. In apparatus for treating materials, an inclined chamber, means for rotating the same, means for introducing into the chamber a material to be treated and a treating medium, a plurality of sets of lipped lifting blades arranged longitudinally of the chamber, retarding means each side of each set of blades, each pair of retarding means dividing the chamber into a series of transverse compartments, each set of blades being adapted to lift the material and to advance and distribute it in a shower entirely across the path of travel of the treating medium toward the succeeding compartment, thus bringing the material repeatedly into contact with the treating medium.

2. In apparatus for treating materials, an inclined chamber, means for rotating the same, means for introducing into the chamber a material to be treated, means for introducing into the chamber a treating medium, means located within the chamber for keeping the material in a finely divided condition and tumbling it in contact with the treating medium in the chamber, and a plurality of means secured to portions of the periphery of the chamber for dislodging such material as may adhere to such dividing and tumbling means adjacent to such portions.

3. Apparatus for treating materials, having a chamber inclosing the material to be treated, means for rotating said chamber, and a plurality of series of buckets in said chamber for elevating and redistributing the material, the buckets of one series being arranged in staggered relation to the buckets of other series, and retarding means of greater height than the buckets interposed between adjacent series of buckets.

4. In apparatus for treating materials by means of a gas, a chamber, an inlet for the gas extending into said chamber, and adjustable doors arranged on the periphery of said inlet and unexposed to the material for controlling the flow of gas therefrom.

5. In apparatus for treating dust-producing materials by means of a gas, stationary heads, an inclined cylinder having its ends open in proximity to said heads, means for rotating said cylinder, an inlet and an outlet for the gas unexposed to the material for the gas, and means for restricting the gas outlet.

6. In apparatus for treating dust producing materials by means of a gas, an inclined cylinder, means for rotating the same, an inlet for the material near the higher end of the cylinder, an exit for the material at the other end of the cylinder, an inlet for the gas projecting into the last mentioned end, and means for varying the position, in the length of the cylinder, at which the gas escapes from the inlet into the cylinder.

7. In apparatus for treating materials, a chamber having therein a series of check rings or ribs on the internal periphery thereof, buckets in one part of said chamber and movable cradles in another part thereof, said buckets and said cradles being located between said ribs.

8. In apparatus for treating materials, an inclined chamber, means for rotating the same, means for introducing into the chamber a material to be treated and a treating medium, said chamber being divided into a series of transverse compartments open toward the center of the chamber, each compartment having located therein and against the casing a set of lipped lifting blades, each blade being adapted to lift the material and to advance and distribute it in a shower entirely across the chamber toward the succeeding compartment, the said retarding means being of greater height than the lifting blades.

9. In apparatus for treating dust-producing materials by means of a gas, stationary heads, a rotating cylinder having its ends in proximity to said heads, means for admitting and withdrawing the material and the gas at opposite ends of the cylinder whereby the material and the gas travel in opposite directions therethrough and means for confining and precipitating dust within said apparatus comprised of devices in the inlet and outlet whereby the flow of gas is diverted from a direct passage through the cylinder and is diffused therethrough.

10. Apparatus for treating materials having a rotary chamber, a plurality of buckets for elevating and redistributing the material to be treated, part of said buckets being capable of movement as respects the said rotary chamber, and part stationary with respect thereto.

11. In an apparatus for treating materials by means of a gas, a chamber, an inlet for the gas extending into said chamber, said inlet having adjustable openings for regulating the flow of gas from the inlet and so positioned as to exclude the material from said inlet regardless of the flow of gas therefrom.

12. In apparatus for treating materials, an inclined chamber, means for rotating the same, means for introducing into the chamber a material to be treated and a treating medium, said chamber being divided into a series of transverse compartments open toward the center of the chamber, each compartment having located therein and against the casing a set of lipped lifting blades, each blade being adapted to lift the material and to advance and distribute it in a shower entirely across the chamber toward the succeeding compartment.

13. In apparatus for treating materials, a rotating chamber for the treatment of materials, a plurality of rings arranged transversely in said chamber, fixed buckets and movable buckets positioned between said rings, said rings being provided with means to support fixed buckets and with means to support movable buckets.

14. A rotary drier, comprising an outer cylinder provided adjacent its front end with a hot air outlet; means for feeding material into the front end of said cylinder; a hot air supply pipe; an inner cylinder within and in communication with said outer cylinder and communicating at its rear end with said hot air supply pipe, said inner cylinder extending into the rear portion only of said outer cylinder a distance to prevent direct contact of the heated air with the material after it has passed through said outer cylinder a distance to be in a comparatively dry state, the parts being arranged to cause a flow of hot air in a direction opposite to the travel of the material through said outer cylinder; and means located at the discharge end of the outer cylinder for preventing ingress of air thereto and in contact with the dried material.

15. A rotary drier, comprising a cylinder provided adjacent its front end with a hot air outlet; means for feeding material into the front end of said cylinder; a hot air supply or source; a conduit extending from said source into the rear end of the cylinder, said conduit extending into the rear portion only of said cylinder a distance to prevent direct contact of the heated air with the material after it has passed through the cylinder a distance to be in a comparatively dry state, the parts being arranged to cause a flow of hot air in a direction opposite to the travel of the material through the cylinder; means coöperating with the rear end of the cylinder to prevent air from entering the same; and means for withdrawing the dried material.

16. In a drier, the combination of a rotary cylinder provided at its front end with a hot air outlet; means for feeding the material to be dried into said front end; means carried by the cylinder for causing a cascading of the material as it is passed therethrough; a source of hot air located adjacent the rear end of the cylinder; a conduit for the hot air extending from said source into the cylinder and in spaced relation thereto, said conduit extending into the rear portion only of said cylinder a distance to prevent direct contact of the heated air with the material after it has passed through the cylinder a distance to be in a comparatively dry state; means located at and coöperating with the rear discharge end of the cylinder to prevent ingress of air thereinto and into contact with the dried material; and means for withdrawing the dried material.

JOHN W. HORNSEY.

Witnesses:
R. I. MIDDLETON,
G. HANSEN.